(12) United States Patent
Augst et al.

(10) Patent No.: US 11,108,209 B2
(45) Date of Patent: Aug. 31, 2021

(54) SINGLE-FREQUENCY FIBER AMPLIFIER WITH DISTAL CLADDING STRIPPER

(71) Applicant: Massachusetts Institute of Technology, Cambridge, MA (US)

(72) Inventors: Steven J. Augst, Acton, MA (US); Kelsey Yee, Arlington, MA (US); Franklin Jose, Woburn, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/864,290

(22) Filed: May 1, 2020

(65) Prior Publication Data

US 2021/0006029 A1    Jan. 7, 2021

Related U.S. Application Data

(60) Provisional application No. 62/869,629, filed on Jul. 2, 2019.

(51) Int. Cl.
*H01S 3/067* (2006.01)
*H01S 3/30* (2006.01)
(Continued)

(52) U.S. Cl.
CPC ...... *H01S 3/06783* (2013.01); *H01S 3/06708* (2013.01); *H01S 3/06737* (2013.01);
(Continued)

(58) Field of Classification Search
CPC ............ H01S 3/06758; H01S 3/06783; H01S 3/0941; H01S 3/094033
See application file for complete search history.

(56) References Cited

U.S. PATENT DOCUMENTS 5,848,215 A    12/1998   Akasaka et al.
6,542,683 B1    4/2003   Evans et al.
(Continued)

FOREIGN PATENT DOCUMENTS

KR    20190048045 A    5/2019

OTHER PUBLICATIONS

Aasi et al., "Advanced LIGO." Classical and Quantum Gravity 32.7 (2015): 074001. 42 pages.
(Continued)

*Primary Examiner* — Michael Carter
(74) *Attorney, Agent, or Firm* — Smith Baluch LLP (57) ABSTRACT

Stimulated Brillouin scattering (SBS) limits the maximum power in fiber lasers with narrow linewidths. SBS occurs when the power exceeds a threshold proportional to the beam area divided by the effective fiber length. The fiber lasers disclosed here operate with higher SBS power thresholds (and hence higher maximum powers at kilohertz-class linewidths) than other fiber lasers thanks to several techniques. These techniques include using high-absorption gain fibers, operating the laser with low pump absorption (e.g., ≤80%), reducing the length of un-pumped gain fiber at the fiber output, foregoing a delivery fiber at the output, foregoing a cladding light stripper at the output, using free-space dichroic mirrors to separate signal light from unabsorbed pump light, and using cascaded gain fibers with non-overlapping Stokes shifts. The upstream gain fiber has high absorption and a larger diameter for high gain, and subsequent gain fiber has a smaller diameter to improve beam quality.

19 Claims, 6 Drawing Sheets

(51) Int. Cl.
H01S 3/0941 (2006.01)
H01S 3/094 (2006.01)

(52) U.S. Cl.
CPC ........ H01S 3/06758 (2013.01); H01S 3/0941 (2013.01); H01S 3/094003 (2013.01); H01S 3/302 (2013.01)

(56) References Cited

U.S. PATENT DOCUMENTS

| | | |
|---|---|---|
| 6,687,440 B2 | 2/2004 | Balestra et al. |
| 6,876,489 B2 | 4/2005 | Islam et al. |
| 7,082,243 B2 | 7/2006 | Bickham et al. |
| 7,167,621 B2 | 1/2007 | Manyam et al. |
| 7,463,411 B2 | 12/2008 | Demidov et al. |
| 7,486,852 B2 | 2/2009 | Rothenberg |
| 7,733,561 B2 | 6/2010 | Mermelstein et al. |
| 7,768,700 B1 | 8/2010 | Savage-Leuchs |
| 7,856,162 B2 | 12/2010 | DiGiovanni et al. |
| 8,009,705 B2 | 8/2011 | Keaton et al. |
| 8,027,557 B2 | 9/2011 | Frith |
| 8,089,689 B1 | 1/2012 | Savage-Leuchs |
| 8,229,260 B2 | 7/2012 | Frith |
| 8,498,046 B2 | 7/2013 | Dong et al. |
| 8,655,129 B2 | 2/2014 | Tankala et al. |
| 9,214,781 B2 | 12/2015 | Honea et al. |
| 9,535,211 B2 | 1/2017 | Rockwell et al. |
| 9,973,278 B2 | 5/2018 | Wang et al. |
| 2005/0152412 A1 | 7/2005 | Leplingard et al. |
| 2009/0116800 A1 | 5/2009 | DiGiovanni et al. |
| 2012/0127563 A1 | 5/2012 | Farmer et al. |
| 2015/0138630 A1 | 5/2015 | Honea et al. |
| 2016/0109656 A1 | 4/2016 | Duesterberg et al. |
| 2016/0195412 A1 | 7/2016 | Barfoot et al. |
| 2017/0272170 A1 | 9/2017 | Wang et al. |
| 2018/0299383 A1 | 10/2018 | Vacca |
| 2019/0097377 A1 | 3/2019 | Kanskar et al. |
| 2019/0140416 A1* | 5/2019 | Abedin ............... H01S 3/06779 |

OTHER PUBLICATIONS

Abbott et al., "Diode-pumped Nd: YAG laser intensity noise suppression using a current shunt." Review of Scientific Instruments 72.2 (2001): 1346-1349.
Abbott et al., "Exploring the sensitivity of next generation gravitational wave detectors." Classical and Quantum Gravity 34.4 (2017): 044001. 19 pages.
Acernese et al., "Advanced Virgo: a second-generation interferometric gravitational wave detector." Classical and Quantum Gravity 32.2 (2014): 024001. 53 pages.
Augst et al., "Coherent beam combining and phase noise measurements of ytterbium fiber amplifiers." Optics Letters 29.5 (2004): 474-476.
Bai et al., "High-power all-fiber single-frequency erbium-ytterbium co-doped fiber master oscillator power amplifier." IEEE Photonics Journal 7.6 (2015): 1-6.
Beier et al., "Single mode 4.3 kW output power from a diode-pumped Yb-doped fiber amplifier." Optics Express 25.13 (2017): 14892-14899.
Creeden et al., "Single frequency 1560 nm Er: Yb fiber amplifier with 207 W output power and 50.5% slope efficiency." Fiber Lasers XIII: Technology, Systems, and Applications. vol. 9728. International Society for Optics and Photonics, 2016. 7 pages.
De Varona et al., "Single-frequency fiber amplifier at 1.5 μm with 100 W in the linearly-polarized TEM 00 mode for next-generation gravitational wave detectors." Optics Express 25.21 (2017): 24880-24892.
Drever et al., "Laser phase and frequency stabilization using an optical resonator." Applied Physics B31.2 (1983): 97-105.
Fan, "Laser beam combining for high-power, high-radiance sources." IEEE Journal of Selected Topics in Quantum Electronics 11.3 (2005): 567-577.

Fujita et al., "High power narrow-linewidth linearly-polarized 1610 nm Er: Yb all-fiber MOPA." Optics Express 24.23 (2016): 26255-26260.
Hemming et al., "A monolithic cladding pumped holmium-doped fibre laser." CLEO: Science and Innovations. Optical Society of America, 2013. 2 pages.
Hemming et al., "A review of recent progress in holmium-doped silica fibre sources." Optical Fiber Technology 20.6 (2014): 621-630.
Hildebrandt et al., "Single-frequency master-oscillator photonic crystal fiber amplifier with 148 W output power." Optics Express 14.23 (2006): 11071-11076.
Koplow et al., "Single-mode operation of a coiled multimode fiber amplifier." Optics Letters 25.7 (2000): 442-444.
Kovalev et al., "Suppression of stimulated Brillouin scattering in high-power single-frequency fiber amplifiers." Optics Letters 31.2 (2006): 161-163.
Kwee et al., "Laser beam quality and pointing measurement with an optical resonator." Review of Scientific Instruments 78.7 (2007): 073103. 11 pages.
Kwee et al., "Stabilized high-power laser system for the gravitational wave detector advanced LIGO." Optics Express 20.10 (2012): 10617-10634.
Libson et al., "Simple method for locking birefringent resonators." Optics Express 23.3 (2015): 3809-3817.
Liem et al., "100-W single-frequency master-oscillator fiber power amplifier." Optics Letters 28.17 (2003): 1537-1539.
Ma et al., "1.89 kW all-fiberized and polarization-maintained amplifiers with narrow linewidth and near-diffraction-limited beam quality." Optics Express 24.4 (2016): 4187-4195.
McClelland et al., LSC instrument science white paper 2017-2018. Tech. Rep. LIGO-T1700231-v3 (LIGO, 2017), 2017. 131 pages.
Mueller, "Beam jitter coupling in advanced LIGO." Optics Express 13.18 (2005): 7118-7132.
Poeld et al., Control loop design for the aLIGO second loop power stabilization. Tech. Rep. LIGO-T1300867 (LIGO, 2013), 2013. 22 pages.
Pound, "Electronic frequency stabilization of microwave oscillators." Review of Scientific Instruments 17.11 (1946): 490-505.
Pulford et al., "400-W near diffraction-limited single-frequency all-solid photonic bandgap fiber amplifier." Optics Letters 40.10 (2015): 2297-2300.
Roy et al., "Yb-doped large mode area fibers with depressed clad and dopant confinement." Fiber Lasers XIII: Technology, Systems, and Applications. vol. 9728. International Society for Optics and Photonics, 2016. 8 pages.
Savage et al., "Pre-stabilized laser design requirements," Tech. Rep. LIGO-T050036-v4 (2010). 9 pages.
Sincore et al., "High average power thulium-doped silica fiber lasers: review of systems and concepts." IEEE Journal of Selected Topics in Quantum Electronics 24.3 (2017): 1-8.
Smith et al., "Overview of a steady-periodic model of modal instability in fiber amplifiers." IEEE Journal of Selected Topics in Quantum Electronics 20.5 (2014): 472-483.
Steinke et al., "Single-frequency fiber amplifiers for next-generation gravitational wave detectors." IEEE Journal of Selected Topics in Quantum Electronics 24.3 (2017): 1-13.
Theeg et al., "Core-pumped single-frequency fiber amplifier with an output power of 158 W." Optics Letters 41.1 (2016): 9-12.
Tröbs et al., "Power-and frequency-noise characteristics of an Yb-doped fiber amplifier and actuators for stabilization." Optics Express 13.6 (2005): 2224-2235.
Wellmann et al., "Characterization of the monolithic fiber amplifier engineering prototype for the next generation of gravitational wave detectors." Fiber Lasers XVI: Technology and Systems. vol. 10897. International Society for Optics and Photonics, 2019. 7 pages.
Wielandy, "Implications of higher-order mode content in large mode area fibers with good beam quality." Optics Express 15.23 (2007): 15402-15409.
Willke et al., "Spatial and temporal filtering of a 10-W Nd: YAG laser with a Fabry-Perot ring-cavity premode cleaner." Optics Letters 23.21 (1998): 1704-1706.

(56) References Cited

OTHER PUBLICATIONS

Willke, Pre-Stabilized Laser Subsystem Testing and Acceptance-L1 PSL (LIGO scientific collaboration). Technical Report No. LIGO-E1100716-v6, 2012. 60 pages.
Winkelmann et al., "Injection-locked single-frequency laser with an output power of 220 W." Applied Physics B 102.3 (2011): 529-538.
Yin et al., "High-power all-fiber wavelength-tunable thulium doped fiber laser at 2 μm." Optics Express 22.17 (2014): 19947-19952.
Zervas et al., "High power fiber lasers: a review." IEEE Journal of Selected Topics in Quantum Electronics 20.5 (2014): 219-241.
Zhang et al., "170 W, single-frequency, single-mode, linearly-polarized, Yb-doped all-fiber amplifier." Optics Express 21.5 (2013): 5456-5462.
Zhao et al., "Gain dynamics of clad-pumped Yb-fiber amplifier and intensity noise control." Optics Express 25.1 (2017): 357-366.
Zhao et al., "High-power all-fiber ultra-low noise laser." Applied Physics B 124.6 (2018): 114. 7 pages.
International Search Report and Written Opinion in International Patent Application No. PCT/US2020/030918 dated Jan. 26, 2021, 14 pages.

\* cited by examiner

SINGLE-FREQUENCY FIBER AMPLIFIER WITH DISTAL CLADDING STRIPPER

CROSS-REFERENCE TO RELATED APPLICATION(S)

This application claims the priority benefit, under 35 U.S.C. § 119(e), of U.S. Application No. 62/869,629, filed on Jul. 2, 2019, which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

Continuous-wave and pulsed fiber laser amplifiers are being used for an ever-increasing variety of applications in industry, for the military, and for science. They are characterized by nearly diffraction-limited beam quality and have been demonstrated to multi-kilowatt power levels. To reach power levels in the kilowatt range, the amplifiers typically use large mode area (LMA) fibers and/or are operated with 10's to 1000's GHz linewidth to mitigate the deleterious effects of stimulated Brillouin scattering (SBS).

Stimulated Brillouin scattering (SBS) is a major obstacle to attaining high-power fiber lasers with narrow linewidths. SBS occurs when a signal-beam photon is converted into a phonon and a lower-frequency scattered photon via the optical fiber's $\chi^{(3)}$ nonlinearity. This scattered photon propagates in the opposite direction as the signal-beam photon and can disrupt the input beam that seeds the fiber laser.

The power threshold for SBS onset, also called the SBS critical power, depends on the mode area of the signal beam, the effective fiber length, and the SBS gain coefficient. The SBS gain coefficient has a linewidth dependence related to the acoustic velocity in the medium. Photons within the gain bandwidth of the Stokes peak contribute to the same SBS feedback. Photons outside the Stokes gain bandwidth are essentially independent, so broadening the linewidth to be larger than the Stokes linewidth increases the power threshold for SBS onset. For silica fibers near a wavelength of 1 μm, the Stokes peak is about 16 MHz wide and center about 16 GHz lower than the signal frequency. For a Yb-doped silica fiber, the Stokes peak is within the gain bandwidth, which is over 50 nm wide (about 15 THz wide at a wavelength of 1 μm).

SUMMARY

Some applications benefit from narrow linewidths (e.g., <1 kHz) that typically limit the amplifier output power to less than 100 W, including coherent LIDAR and gravitational-wave detection using laser interferometers, such as found in the Laser Interferometer Gravitational-wave Observatory (LIGO). Unfortunately, reducing the linewidth also reduces the power threshold for SBS onset, which in turn reduces the fiber amplifier's maximum achievable output power.

A fiber amplifier with gain fibers having different absorptions and core sizes can achieve high power and narrow linewidth with good beam quality. Using gain fibers with different absorptions reduces the overall gain fiber length, suppressing stimulated Brillouin scattering (SBS) and increasing the output power. This is because low absorption per unit length translates to a longer fiber to absorb the same amount of pump light. Higher absorption can be accomplished by increasing the ratio of the core and cladding diameters, but a larger core diameter often results in worse beam quality. High gain (and therefore high power) can be achieved without degrading beam quality by using successive gain fibers with smaller core sizes. Variations in glass chemistry among the gain fibers can suppress SBS by changing the speed of sound in the gain fibers, thereby avoiding overlap of Stokes peaks. If desired, a cladding light stripper on the fiber output of the fiber amplifier can remove both pump light and high-angle signal light propagating in the cladding.

An inventive fiber amplifier may include first and second gain fibers. The first gain fiber has a first core diameter and a first absorption at a pump beam wavelength and guides and amplifies a signal beam. The second gain fiber is coupled to the first gain fiber and has a second core diameter smaller than the first core diameter and a second absorption at the pump beam wavelength lower than the first absorption. The second gain fiber further guides and amplifies the signal beam. The first and second gain fibers can have non-overlapping Stokes shifts. They may be spliced together or coupled together with a mode-field adapter.

The amplifier may include a cladding light stripper, coupled to an output of the second gain fiber, to remove light propagating in a cladding of the second gain fiber. The cladding light stripper can include a bare fiber waveguide with an etched outer surface coupled to an etched coreless endcap. The base fiber waveguide and/or the etched coreless endcap has a first refractive index surrounded circumferentially by a cladding with a second refractive index higher than the first refractive index.

The fiber amplifier may also include a first set of pump diodes, coupled to first gain fiber, to inject pump light at the pump wavelength into the first gain fiber. The first gain fiber may guide a portion of the pump light into the second gain fiber. Alternatively, or additionally, a second set of pump diodes, coupled to second gain fiber, can inject pump light at the pump wavelength into the second gain fiber.

Another fiber amplifier includes first and second gain fibers coupled together to guide and amplify the signal beam. The first gain fiber has a first core diameter and a first Stokes shift at a first Stokes frequency and a linewidth of up to about 16 MHz. The second gain fiber has a second core diameter smaller than the first core diameter and a second Stokes shift at a second Stokes frequency shifted from the first Stokes frequency by at least about 30 MHz and a linewidth of up to about 16 MHz.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

DETAILED DESCRIPTION

The power threshold for the onset of stimulated Brillouin scattering (SBS) is proportional to the cross-sectional area of the signal beam divided by the effective fiber length, which is the fiber length weighted by the internal power (for constant power, the effective fiber length is the actual fiber length). For gain fibers, the effective length is shorter than the actual length because the sections of fiber with low optical power do not contribute significantly to SBS. In practice, for high-power fiber amplifiers, one can usually ignore the SBS contributions for sections of fiber where the power is less than half the total output power. The beam area can be enlarged by using large-mode area (LMA) fibers, but this can degrade the beam quality. The fiber length can be kept short by using high-absorption fibers and/or operating the fiber laser with low pump absorption if laser efficiency is not a driver. In other words, if the fiber is too short to effectively absorb the pump light, the efficiency is usually poor. Generally, there is a tradeoff between good efficiency (longer gain fiber) and suppressing SBS (shorter gain fiber).

The laser systems described here use one or more techniques to achieve high power (e.g., >100 W) with kHz-class linewidth. More specifically, an example laser system can use a shorter fiber(s) that absorbs less than about 80% of the pump light to increase the power threshold for SBS onset (e.g., to 100 W, 200 W, 300 W, or more). (The lower-than-typical absorption reflects a sacrifice in efficiency to avoid or suppress SBS by reducing the fiber length.) Reducing the absolute pump power reduces the output power, but does not change the SBS threshold power, which is determined by the amplifier configuration. The pump light absorption can be described as following an exponential decay (in regions of the fiber where the amplifier is running in saturation), so each extra meter of fiber absorbs the same percentage of remaining pump light. For example, if the absorption is 1.5 dB/m, adding two meters of fiber can increase the total absorption from 60% to 80%, adding another two meters increases the absorption from 80% to 90%, and adding another two meters increases the absorption from 90% to 95%. So running the laser at 80% absorption or less makes it possible to achieve a higher SBS threshold than running the laser at 90% absorption.

The laser system may not have a delivery fiber or cladding light stripper and/or may have free-space dichroic mirrors to separate signal light from unabsorbed pump light. In addition, the laser system may have two or more gain fibers arranged sequentially, with the gain fiber at the input having relatively large core diameter to provide high absorption and to avoid SBS onset and subsequent gain fiber(s) having a smaller core to improve beam quality. These gain fibers may have different chemistries such that the Stokes shift of one gain fiber does not overlap with the Stokes shift(s) of the other gain fiber(s).

Co-Pumped and Counter-Pumped Fiber Amplifiers with Cladding Light Strippers

Figure 1:
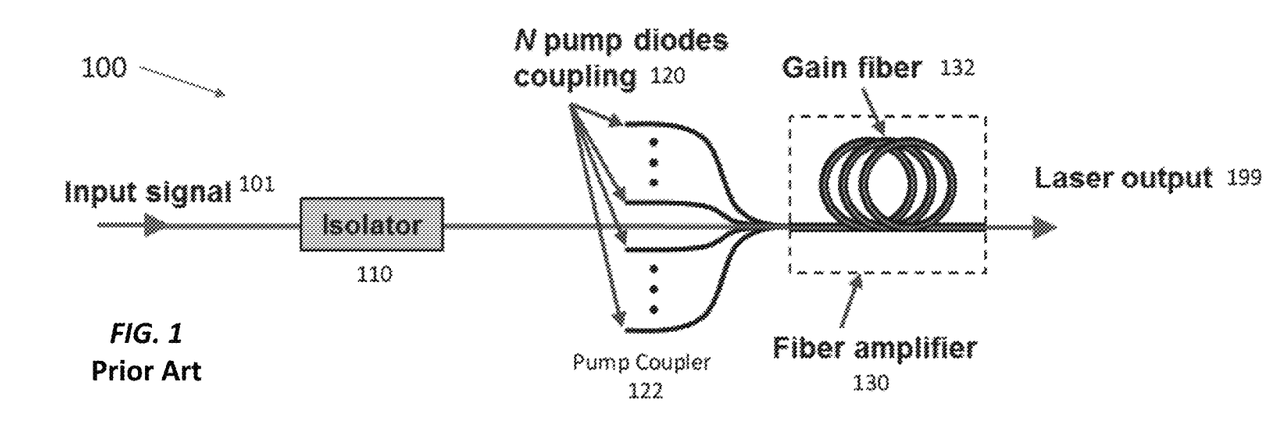
FIG. 1 shows a conventional co-pumped fiber amplifier.

FIG. 1 shows a conventional co-pumped fiber amplifier system 100. This co-pumped fiber amplifier 100 includes a fiber-coupled isolator 110 coupled to a fiber amplifier 130 with a double-clad gain fiber 132. One or more pump diodes 120 coupled to the fiber amplifier 130 via a pump coupler 122 launch pump light into the inner cladding of the gain fiber 132, amplifying an input signal 101 to produce an amplified output 199. In the co-pumped fiber amplifier system 100 shown in FIG. 1, the pump light propagates in the same direction as the input signal 101 and output 199.

Figure 2:
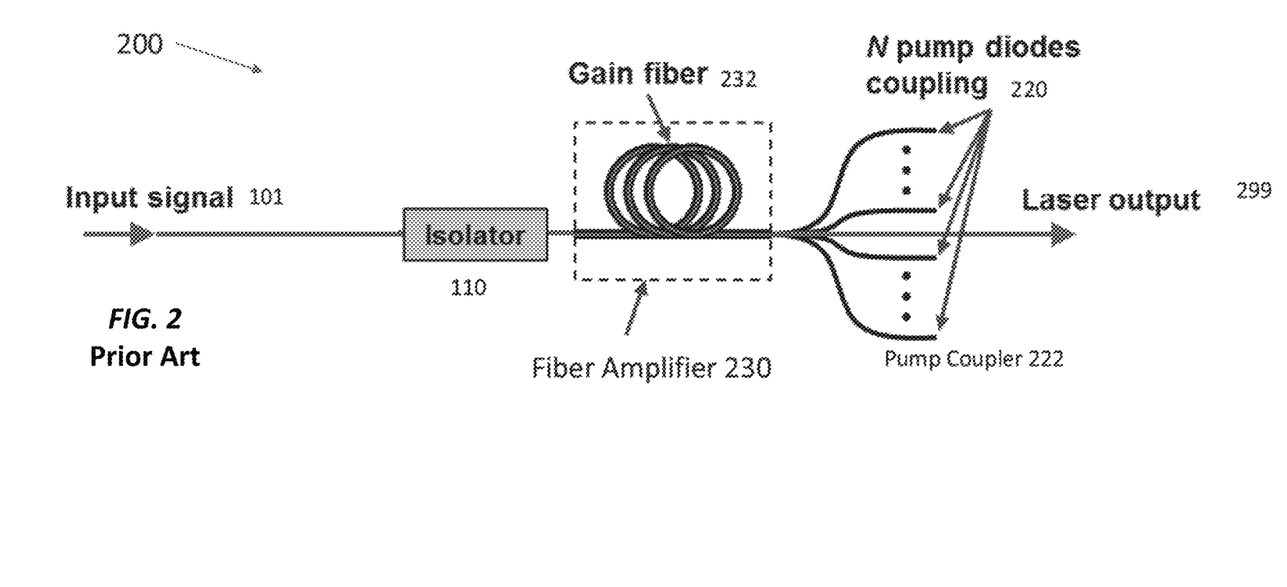
FIG. 2 shows a conventional counter-pumped fiber amplifier.

FIG. 2 shows a counter-pumped fiber amplifier system 200. Like the co-pumped fiber amplifier system 100 in FIG. 1, the counter-pumped fiber amplifier system 200 includes a fiber-coupled isolator 110 coupled to a fiber amplifier 230 with a double-clad gain fiber 232. In this case, however, the pump diodes 220 are coupled to the distal end of the double-clad gain fiber 232 via a fiber pump coupler 222 and launch counter-propagating pump light into the gain fiber's inner cladding. That is, the pump light propagates in the opposite direction as the input signal 201 and amplified output 299. The counter-propagating pump geometry decreases the effective fiber length, thereby increasing the SBS threshold. But the counter-pumped fiber amplifier system has a splice between the pump coupler 222 and the output of the gain fiber 232, which can degrade beam quality, and uses an un-pumped section of fiber at the output, which increases the effective fiber length.

Figure 3:
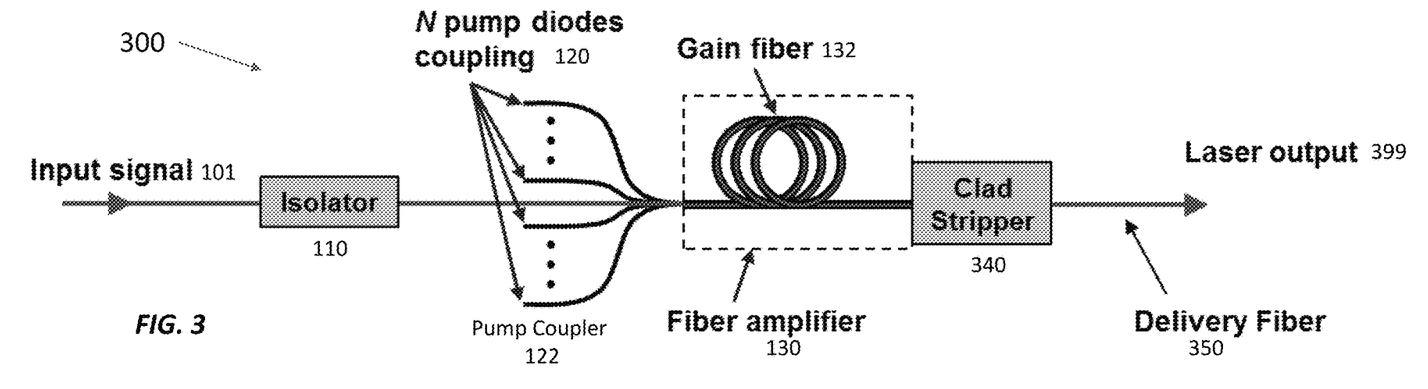
FIG. 3 shows a co-pumped fiber amplifier with a cladding light stripper.

FIG. 3 shows a fiber amplifier system 300 with a cladding-light stripper 340 incorporated into its output. The cladding-light stripper 340 removes unabsorbed pump light and high-angle signal light that is trapped in the cladding of the gain fiber 132. In FIG. 3, the cladding light stripper 340 is coupled between the fiber amplifier's gain fiber 132 and a delivery fiber 350, which guides the laser output 399 to its destination. If the delivery fiber 350 has a different glass chemistry than the gain fiber 132 such that their Stokes shifts do not overlap, any SBS generated in the delivery fiber 350 should not seed SBS in the gain fiber 132.

Figure 4:
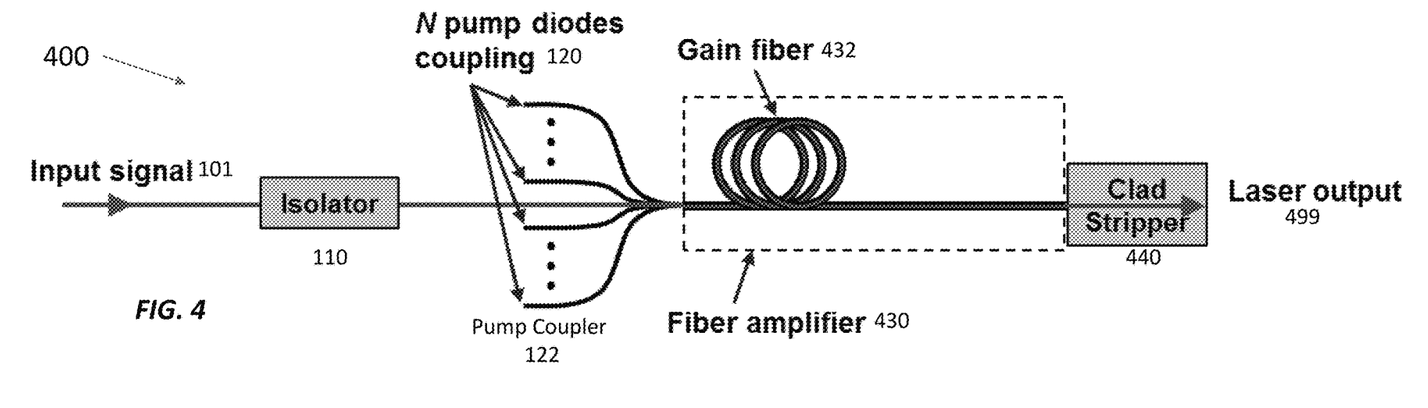
FIG. 4 shows a co-pumped fiber amplifier with a cladding light stripper at the end of fiber output.

FIG. 4 shows a fiber amplifier system 400 with a cladding-light stripper 440 directly at its output. In this system 400, the delivery fiber is omitted. The cladding light stripper 440 is coupled directly to the output end of the gain fiber 432 in the fiber amplifier 430. Again, the cladding light stripper 440 removes unabsorbed pump light and high-angle signal light that is trapped in the cladding of the gain fiber 432. In this case, the gain fiber 432 may be marginally longer for equivalent SBS performance (relative to the system in FIG. 3), allowing additional absorption of pump light.

Cladding Light Stripper

Figure 5:
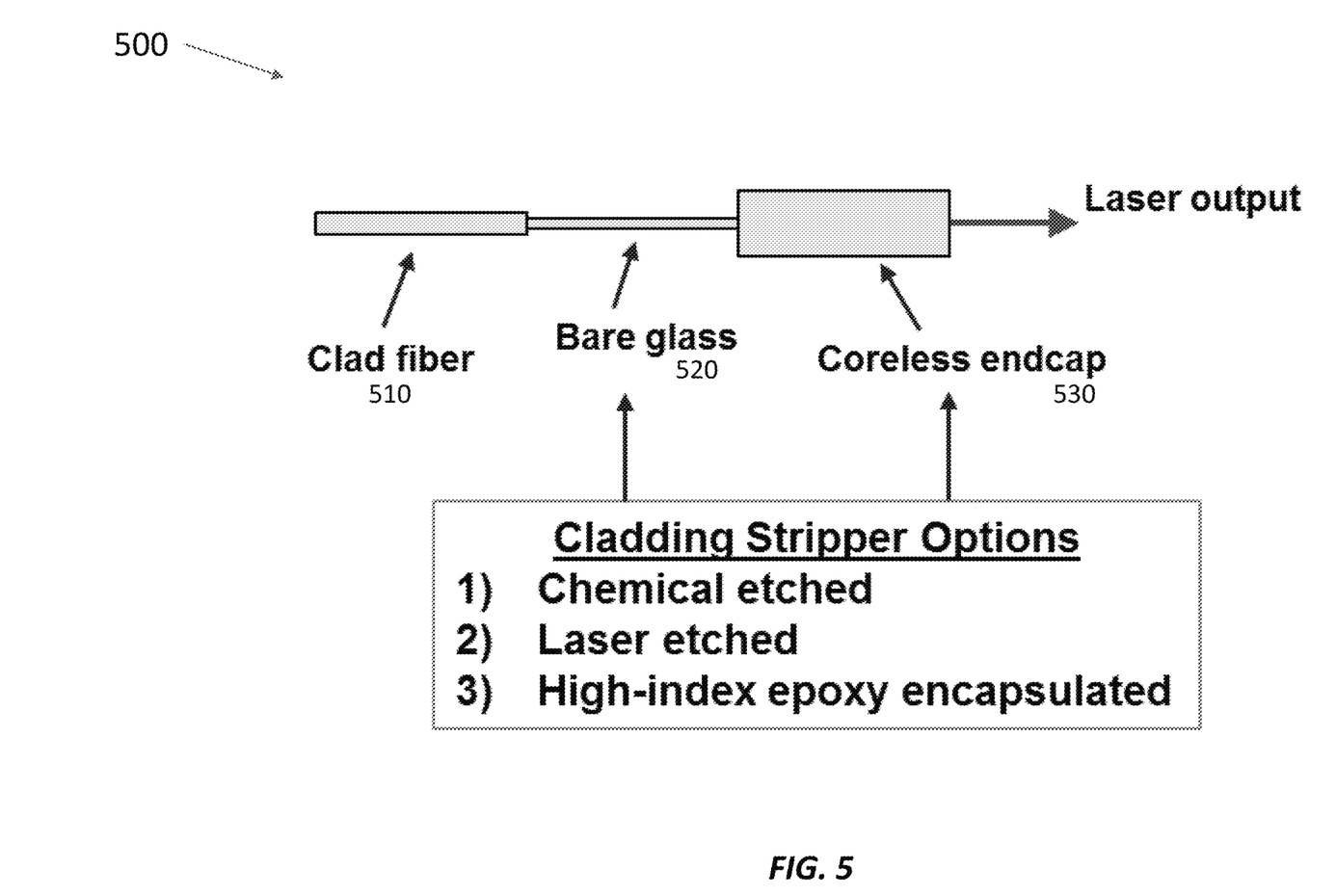
FIG. 5 shows a cladding light stripper at a fiber output in greater detail.

FIG. 5 shows an inventive cladding light stripper 500 that removes light guided by the inner cladding of a double-clad (gain) fiber. Unlike other cladding light strippers, the inventive cladding light stripper 500 is right at the end of the fiber and is incorporated into the fiber endcap. It includes a section of double-clad optical fiber 510 coupled to a length of optical fiber with cladding removed to expose the bare waveguide glass 520. The outer surface of this bare waveguide glass 520 is etched, either by chemical etch or by laser etch, and its end is spliced to a coreless endcap 530, which may also be etched chemically or with a laser. The bare waveguide glass 520 can be about 15-50 mm long with an outer diameter that matches the outer diameter of the optical fiber 510. The bare waveguide glass 520 has a rough outer surface to strip away cladding light and is a contiguous continuation of the optical fiber 510. The endcap 530 may be made of fused silica with an outer diameter ranging from 400 µm to 20 mm (e.g., 2 mm) and length of about 1 mm to 30 mm (e.g., 15 mm for 2 mm diameter). The endcap's length is restricted by the diameter and is selected so that the light is not clipped on the circumference by normal Gaussian beam expansion of the amplified signal light coming out of the core of the optical fiber 510. Like the bare waveguide glass 520, the endcap 530 also has a rough outer surface to strip away cladding light.

The core of the double-clad optical fiber 510 guides amplified signal light and the inner cladding of the double-clad optical fiber 510 guides excess pump light and high-angle signal light. The amplified signal light propagates through the core of the bare waveguide glass 520 and into coreless endcap 530, where is expands by Gaussian diffraction before exiting the output of the cladding light stripper 500. The excess pump light and high-angle signal light couples out of the roughened outer surfaces of the bare waveguide glass 520 and/or the coreless endcap 530 into the surrounding medium (e.g., air). The bare waveguide glass 520 and/or the endcap 530 can also be encapsulated in high-index material (e.g., high-index epoxy or metal; not shown) to couple more cladding light out of the fiber 510 so it is not emitted from the endcap facet.

This cladding light stripper 500 can be used with single-frequency fiber amplifiers, including those shown in FIGS. 1 and 2, and large-linewidth amplifiers. The cladding light stripper 500 can be coupled to the end of the gain fiber, without a delivery fiber, as in FIG. 4. It can greatly attenuate light propagating in the cladding over a small distance (e.g., 16 dB attenuation in a bare glass stripper that is 5 cm or shorter) and when etched with a laser can have a relatively high tensile strength (e.g., a bare glass stripper can withstand over 90 kpsi), especially compared to more conventional chemically etched cladding light strippers.

Dual-Fiber Amplifiers

The gain fiber length can be reduced or minimized by using high-absorption fiber. High-absorption fiber typically has a large core area, which can degrade laser beam quality. If exquisite beam quality is desired, smaller core fiber is generally used at the expense of pump absorption (which makes the fiber longer and makes SBS more problematic). In order to increase the threshold power for SBS onset, a dual-fiber amplifier has a first section of dual-clad gain fiber with relatively high absorption of pump light (say, 5-20 dB/meter, for example, 10 dB/meter) followed by another section of dual-clad gain fiber with a smaller core and somewhat lower absorption of pump light (say, 2-10 dB/m, for example, 5 dB/m).

Figures 6A, 6B:
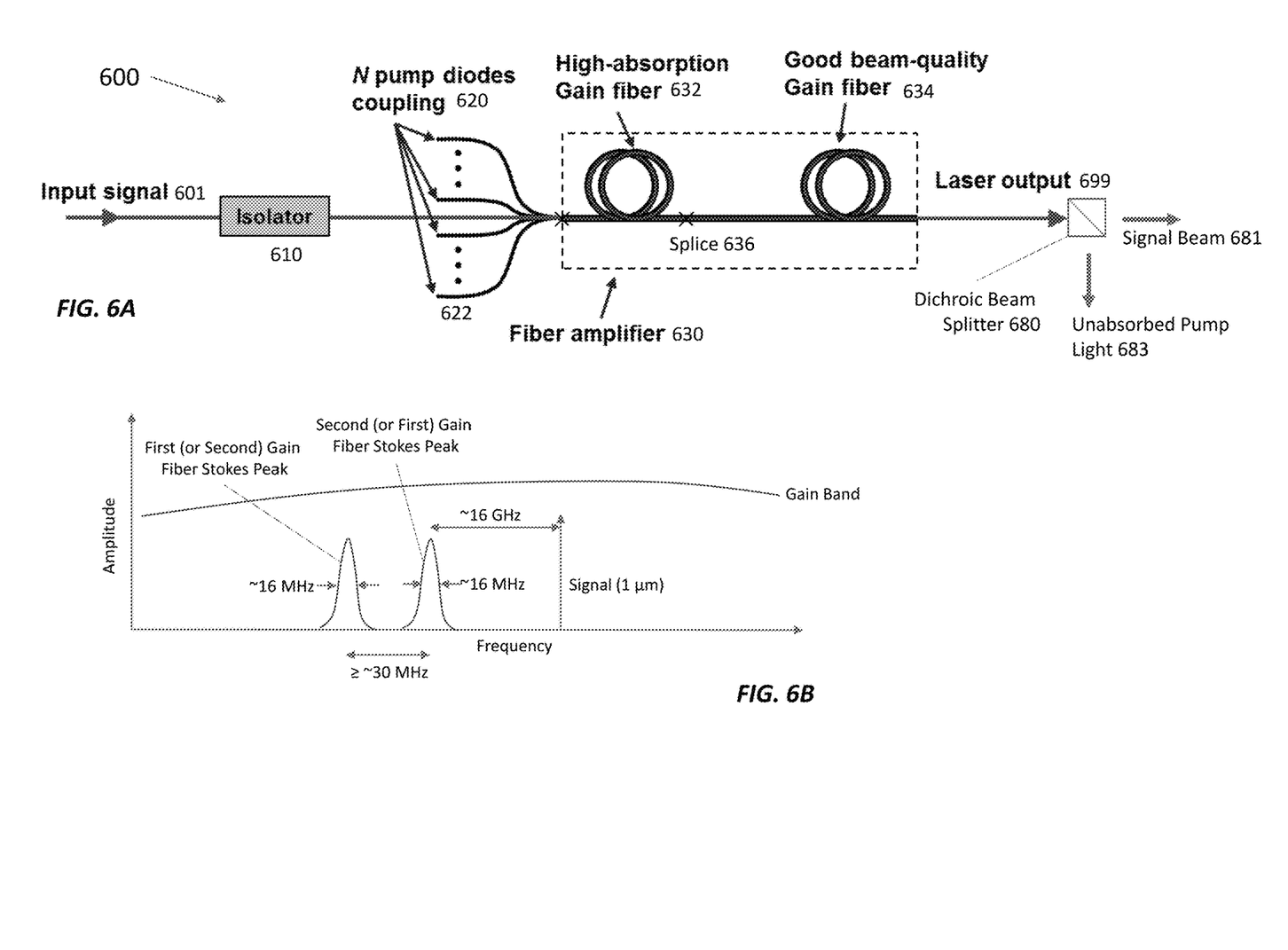
FIG. 6A shows a dual-fiber amplifier for high absorption and good beam quality. The splice between fibers maintains the integrity of the outer cladding so that pump light is guided into the second gain fiber.
FIG. 6B shows a plot of the Stokes peaks and gain bandwidths for the gain fibers in the dual-fiber amplifier of FIG. 6A.

FIG. 6A shows a fiber amplifier system 600 with a fiber amplifier 630 that includes two different double-clad gain fibers 632 and 634, which are spliced together at a splice 636. An input signal 601 is coupled into the fiber amplifier 630 via an isolator 610, which prevents light from propagating upstream to the input signal source and disrupting the input signal 101. The fiber amplifier 630 is pumped by co-propagating pump light from one or more pump diodes 620 via a fiber pump coupler 622.

The first gain fiber 632 is long enough to absorb about 2-5 dB of pump light (e.g., 10 cm to 1 meter long, depending on the absorption). Likewise, the second gain fiber 634 is also long enough to absorb about 2-5 dB of pump light (e.g., 20 cm to 2.5 meters long, depending on the absorption). In operation, the first gain fiber 632 may provide about 6-20 dB of gain and the second gain fiber 634 may provide about 2-6 dB of gain.

The first gain fiber 632 may have a core diameter of about 25-40 µm (e.g., 35 µm) and an inner cladding diameter of about 150-400 µm (e.g., 250 µm). The second gain fiber 634 may have a core diameter of about 10-25 µm (e.g., 20 µm) and an inner cladding diameter of about 125-400 µm (e.g., 250 µm). The fiber amplifier 630 may have more than two gain fibers (e.g., three, four, five, or more), each with a smaller core diameter than the immediately preceding gain fiber. In general, the ratio of core diameters in successive fibers depends on the quality of the mode-field-adapting splices that connect the successive fibers. For example, it is relatively routine to couple successive fibers with core diameters of 20 µm and 25 µm or of 25 µm and 30 µm. However, coupling 20 µm to 35 µm core diameters for example, can be done, but it is more challenging. In the limit, the gain fiber may be a single fiber whose core diameter tapers smoothly from a larger value (e.g., 40 µm) to a smaller value (e.g., 20 µm) with a constant or tapered inner cladding diameter (e.g., 250 µm) over a length of 20 cm to about 2 meters.

FIG. 6B shows notional Stokes peaks and gain band for the first gain fiber 632 and second gain fiber 634 (amplitudes are not to scale) in the dual-fiber amplifier 600. The first gain fiber 632 and the second gain fiber 634 typically have glass chemistries that differ enough such that the Stokes shift of one fiber does not overlap with the Stokes shift of the other. (Either peak can be shifted to lower frequency.) This means that the SBS generated in one gain fiber (e.g., the second gain fiber 634) does not seed SBS in the other gain fiber (e.g., the first gain fiber 632). A typical Stokes shift is about 16 GHz for 1 µm light in silica fibers. The Stokes linewidth is typically about 16 MHz at a wavelength of 1 µm and can vary, depending on the fiber chemistry. The Stokes shift difference between the gain fibers should be larger than the Stokes linewidth (e.g., 30 MHz, 100 MHz, or more).

The first gain fiber 632 and the second gain fiber 634 can be coiled with an appropriate radius of curvature to suppress higher-order spatial modes without creating excess loss of the fundamental mode. In practice, the gain fibers 632, 634 may be coiled tightly enough to produce predominantly a single mode (the fundamental mode) at the output by suppressing all other modes. Typical configurations usually suppress all but the $LP_{01}$ mode somewhere along the gain fibers 632, 634. The output of each gain fiber 632, 634 may be relatively straight, with an adiabatic transition from bent to straight.

In the fiber amplifier system 600 in FIG. 6A, the first gain fiber 632 is spliced directly to the second gain fiber 634 at a splice 636. The splice 636 between the first gain fiber 632 and the second gain fiber 634 can be recoated with low-index material so that pump light traveling in the inner cladding of the first gain fiber 632 is guided from the first gain fiber 632 into the second gain fiber 634. But because the core of the first gain fiber 632 has a larger diameter than that of the second gain fiber 634 it is desirable to make a splice with an adiabatic taper to act as a mode-field adapter to provide efficient transfer of signal light from the first gain fiber 632 to the second gain fiber 634. However, some of the amplifier signal beam from the first gain fiber 632 may couple into the inner cladding of the second gain fiber 634 instead of into the core of the second gain fiber 634. This can reduce the fiber amplifier system's overall efficiency.

The fiber amplifier 630 emits the output 699 directly; there is no passive delivery fiber at the output of the fiber laser system 600. Instead, a free-space dichroic beam splitter 680 separates the output 699 into an amplified signal beam 681 and unabsorbed pump light 683. Alternatively, a cladding mode stripper 720 (e.g., the cladding mode stripper 500 in FIG. 5) coupled to the output of the fiber amplifier 630 can strip the unabsorbed pump light from the output 799 as in the fiber amplifier system 700 in FIG. 7.

Figure 7:
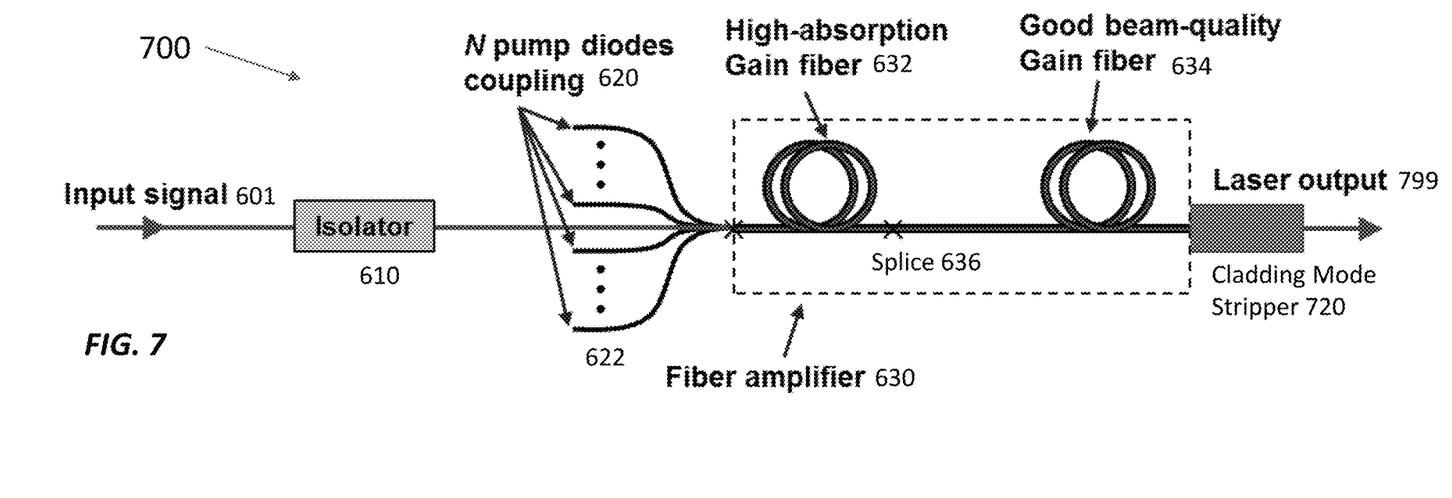
FIG. 7 shows a dual-fiber amplifier with a cladding mode stripper at the output.
Figure 8:
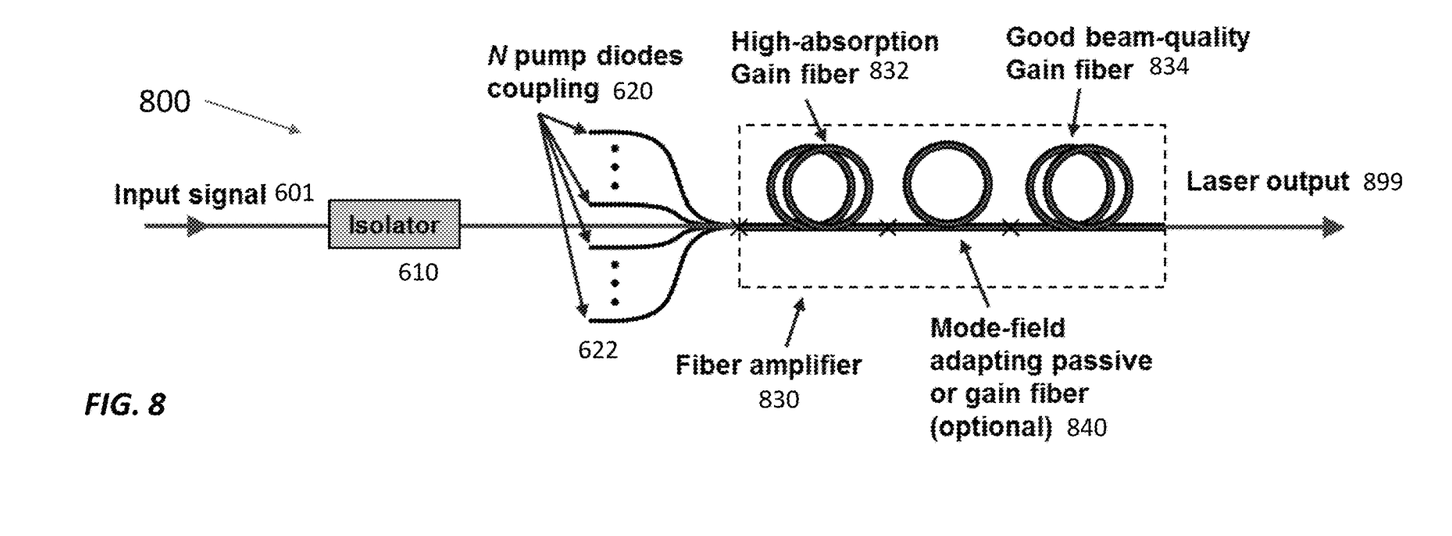
FIG. 8 shows a dual-fiber amplifier with optional mode-field adapting fiber. The mode-field adapting fiber is double clad in this depiction, and the splices between fibers preserve the integrity of the outer cladding so that pump light is guided from one fiber into the next.

If the beam diameter (known as the mode-field diameter (MFD)) in the high-absorption gain fiber (first gain fiber 632 in FIG. 6A) is too large relative to the MFD of the lower-absorption gain fiber (second gain fiber 634), it can be useful to introduce an active or passive mode-field adapting fiber 840 in between the first gain fiber 832 and second gain fiber 834 in the amplifier 830 as shown in FIG. 8. This mode-field adapting fiber 840 can be double-clad with low-index-recoated splices (or air guided) to guide pump light from the first gain fiber 832 to the second gain fiber 834. The first gain fiber 832 and second gain fiber 834 may have MFDs of about 20-29 μm (e.g., 24 μm) and 9-20 μm (e.g., 18 μm), respectively. As shown in FIGS. 6 and 7, mode-field adaptation can be accomplished by splicing the gain fibers together without the (optional) mode-field adapting fiber 840. For mode mismatches greater than about 20% in diameter, though, connecting the first gain fiber 832 and second gain fiber 834 with the optional mode-field adapting fiber 840 may be easier and lead to an output 899 with higher beam quality and/or higher power.

In the fiber amplifier 630 shown in FIGS. 6 and 7, the pump diodes 620 launch pump light into the inner cladding of the first gain fiber 632 via the fiber pump coupler 622. The first gain fiber 632 absorbs some of this pump light and launches the rest into the inner cladding of the second gain fiber 634, which guides and absorbs the rest of the pump light. Any unabsorbed pump light exits the fiber amplifier 630 and can be separated from the amplified signal light using a dichroic beam splitter 680 (FIG. 6A) or cladding mode stripper 720 (FIG. 7) as described above.

Figure 9:
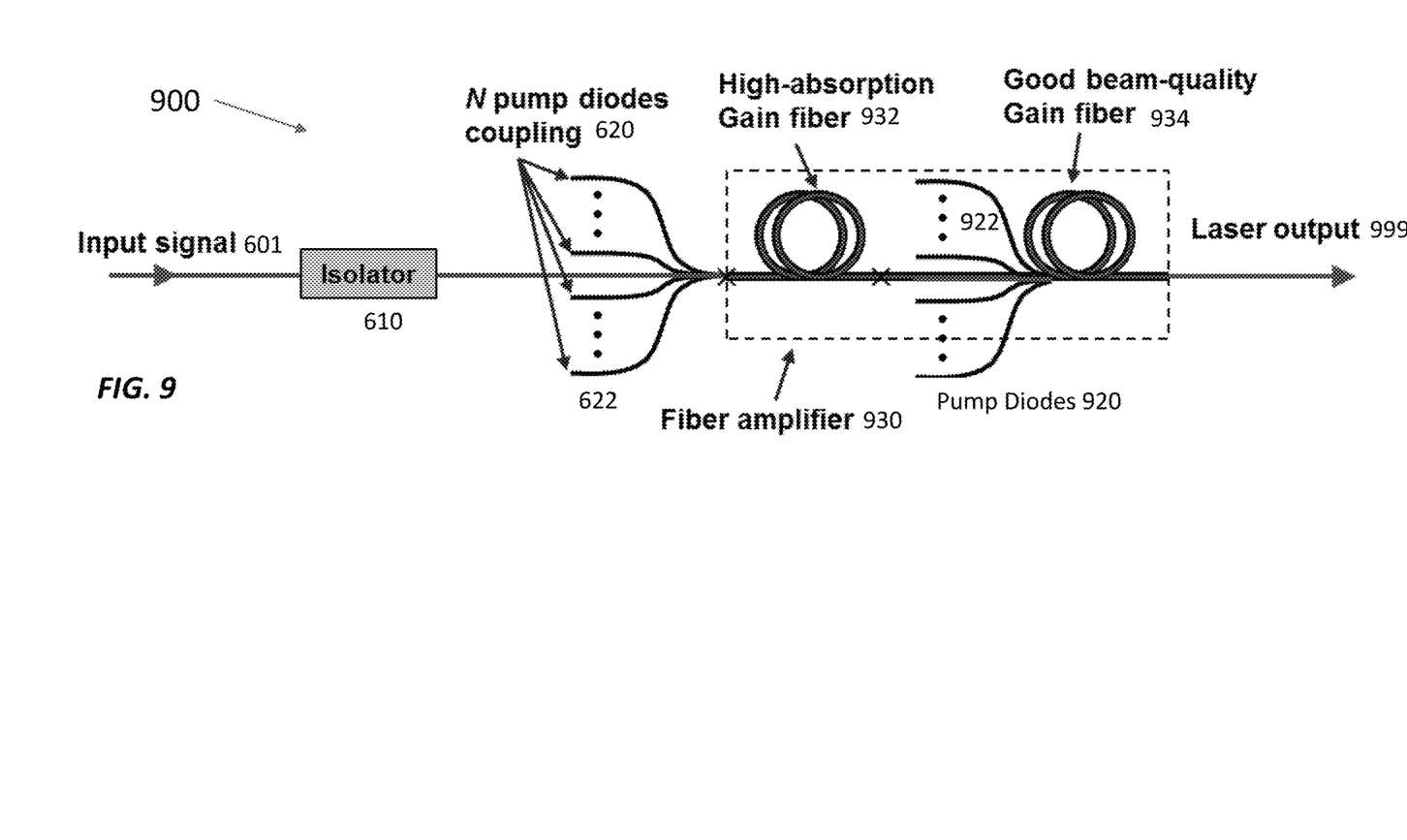
FIG. 9 shows a dual-fiber amplifier with a first set of pump diodes that pumps the first gain fiber and a second set of pump diodes that pumps the second gain fiber.

Alternatively, the second gain fiber 934 can be pumped by different pump diodes 920 as in the fiber amplifier system 900 shown in FIG. 9. Like the fiber amplifier systems shown in FIGS. 6-8, this fiber amplifier system 900 includes a fiber amplifier 930 that receives an input signal 601 from a seed source (not shown) and pump beams from one or more pump diodes 620. The pump beams from these pump diodes 620 pump a first, high-absorption gain fiber 932, which is spliced to a second gain fiber 934 with a smaller diameter than the first gain fiber 932. A second set of pump diodes 920 pumps the second gain fiber 934 via a fiber combiner 922 that couples pump light from the pump diodes 920 into the inner cladding of the second gain fiber 934. By pumping the first gain fiber 932 and second gain fiber 934 with separate pump diodes 620 and 920, respectively, the gain fibers can be pumped higher and/or the pump diodes can be lower power. In general, pumping different gain fibers with different (sets of) pump diodes increases the gain in the second fiber (to about 3-13 dB for example), which helps with beam quality and power stability; increases the overall output power, and distributes the heat more evenly at the expense of complexity, size, and lower overall electrical efficiency.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A fiber amplifier comprising:
    a first gain fiber, having a first core diameter and a first absorption at a pump beam wavelength, to guide and amplify a signal beam; and
    a second gain fiber, coupled to the first gain fiber and having a second core diameter smaller than the first core diameter and a second absorption at the pump beam wavelength lower than the first absorption, to further guide and amplify the signal beam,
    wherein the first gain fiber and the second gain fiber have non-overlapping Stokes shifts.

2. The fiber amplifier of claim 1, wherein the first gain fiber is spliced to the second gain fiber.

3. The fiber amplifier of claim 1, further comprising:
    a mode-field adapter, connecting the first gain fiber to the second gain fiber, to couple the signal beam from the first gain fiber to the second gain fiber.

4. The fiber amplifier of claim 1, further comprising:
    a cladding light stripper, coupled to an output of the second gain fiber, to remove light propagating in a cladding of the second gain fiber.

5. The fiber amplifier of claim 4, wherein the cladding light stripper comprises a bare fiber waveguide with an etched outer surface coupled to an etched coreless endcap.

6. The fiber amplifier of claim 5, wherein at least one of the bare fiber waveguide or the etched coreless endcap has a first refractive index surrounded circumferentially by a cladding with a second refractive index higher than the first refractive index.

7. The fiber amplifier of claim 1, further comprising:
    a first set of pump diodes, coupled to first gain fiber, to inject pump light at the pump wavelength into the first gain fiber.

8. The fiber amplifier of claim 7, wherein the first gain fiber guides a portion of the pump light into the second gain fiber.

9. The fiber amplifier of claim 7, further comprising:
    a second set of pump diodes, coupled to second gain fiber, to inject pump light at the pump wavelength into the second gain fiber.

10. A method of amplifying a beam of light, the method comprising:
    coupling the beam of light into a first gain fiber having a first core diameter and a first absorption at a pump beam wavelength;
    guiding the beam of light through the first gain fiber while pumping the first gain fiber with pump light at the pump beam wavelength;
    coupling the beam of light from the first gain fiber into a second gain fiber having a second core diameter smaller than the first core diameter and a second absorption at the pump beam wavelength lower than the first absorption; and
    guiding the beam of light through the second gain fiber while pumping the second gain fiber with additional pump light at the pump beam wavelength,
    wherein the first gain fiber and the second gain fiber have non-overlapping Stokes shifts.

11. The method of claim 10, wherein the first gain fiber is spliced to the second gain fiber.

12. The method of claim 10, further comprising:
    removing light propagating in a cladding of the second gain fiber.

13. The method of claim 12, wherein removing light propagating in the cladding of the second gain fiber comprises guiding the beam of light through a bare fiber waveguide with an etched outer surface coupled to an etched coreless endcap.

14. The method of claim 13, wherein guiding the beam of light through the bare fiber waveguide and the etched coreless endcap comprises coupling light out of at least one of the bare fiber waveguide or the etched coreless endcap via a cladding having a refractive index higher than a refractive index of the at least one of the bare fiber waveguide or the etched coreless endcap.

15. The method of claim 10, further comprising:
injecting the pump light into the first gain fiber with a first set of pump diodes.

16. The method of claim 15, further comprising:
coupling the additional pump light from the first gain fiber into the second gain fiber.

17. The method of claim 15, further comprising:
injecting the additional pump light into the second gain fiber with a second set of pump diodes.

18. A method of amplifying a beam of light, the method comprising:
coupling the beam of light into a first gain fiber having a first core diameter and a first absorption at a pump beam wavelength;
guiding the beam of light through the first gain fiber while pumping the first gain fiber with pump light at the pump beam wavelength;
coupling the beam of light from the first gain fiber into a second gain fiber having a second core diameter smaller than the first core diameter and a second absorption at the pump beam wavelength lower than the first absorption; and
guiding the beam of light through the second gain fiber while pumping the second gain fiber with additional pump light at the pump beam wavelength,
wherein coupling the beam of light from the first gain fiber into the second gain fiber comprises adapting a transverse dimension of a fundamental mode guided by the first gain fiber to a size matching a fundamental mode guided by the second gain fiber.

19. A fiber amplifier comprising:
a first gain fiber, having a first core diameter and a first Stokes shift at a first Stokes frequency and a linewidth of up to about 16 MHz, to guide and amplify a signal beam; and
a second gain fiber, coupled to the first gain fiber and having a second core diameter smaller than the first core diameter and a second Stokes shift at a second Stokes frequency shifted from the first Stokes frequency by at least about 30 MHz and a linewidth of up to about 16 MHz, to further guide and amplify the signal beam.

* * * * *